United States Patent
Huang

(10) Patent No.: US 9,540,200 B2
(45) Date of Patent: Jan. 10, 2017

(54) REEL

(71) Applicant: Ping-Chun Huang, Taichung (TW)

(72) Inventor: Ping-Chun Huang, Taichung (TW)

(*) Notice: Subject to any disclaimer, the term of this patent is extended or adjusted under 35 U.S.C. 154(b) by 124 days.

(21) Appl. No.: 14/296,456

(22) Filed: Jun. 5, 2014

(65) Prior Publication Data
US 2015/0352997 A1   Dec. 10, 2015

(51) Int. Cl.
*B65H 75/28*   (2006.01)
*B65H 18/08*   (2006.01)
*B60P 7/08*   (2006.01)
*B65H 16/00*   (2006.01)
*B60D 1/18*   (2006.01)

(52) U.S. Cl.
CPC ............... *B65H 18/08* (2013.01); *B60D 1/185* (2013.01); *B60P 7/0846* (2013.01); *B65H 16/005* (2013.01); *B65H 2402/412* (2013.01); *B65H 2701/375* (2013.01)

(58) Field of Classification Search
CPC ...................................................... B65H 75/28
USPC .................................. 242/532.6, 587.2–587.3
See application file for complete search history.

(56) References Cited

U.S. PATENT DOCUMENTS 4,967,976 A * 11/1990 Kawai ..................... B60R 22/34
                                                             242/376
5,452,863 A *  9/1995 Hardy, Sr. ............... B60R 22/34
                                                             242/376

* cited by examiner

*Primary Examiner* — Sang Kim

(57) ABSTRACT

A retractable strap apparatus includes a reel, an axle and a strap. The reel includes a bore axially made therein, a flat face located by the bore, and a slot made therein along a secant line so that the bore is separated from the slot. The axle includes a flat face. The axle is inserted in the bore so that the flat face of the axle is in contact with the flat face of the reel so that the axle is rotatable together with the reel. The strap includes an end directed through the slot and connected to another portion of the strap.

9 Claims, 8 Drawing Sheets

REEL

BACKGROUND OF INVENTION

1. Field of Invention

The present invention relates to tow strap apparatuses and tie-down apparatuses and, more particularly, to a reel for a tow strap apparatus or a tie-down apparatus.

2. Related Prior Art

As disclosed in U.S. Pat. No. 7,942,360, a tow strap apparatus includes a reel 28 that includes a hub 36. The reel 28 includes two halves 32. The hub 36 includes two halves (not numbered) each formed on a corresponding half 32 of the reel 28. A tow strap 18 includes a portion sandwiched between the halves of the hub 36. Each of the halves of the hub 36 includes teeth 40 for biting the tow strap 18 so that the tow strap 18 cannot slide relative to the hub 36. The teeth 40 cause damages in the tow strap 18 inevitably. Such damages render the strap 18 vulnerable to rupture.

As disclosed in U.S. Pat. No. 8,651,509, a tow strap apparatus includes a reel 31 that includes an axle 30 formed between two discs 38. The axle 30 includes a slot 32. A tow strap 20 includes a portion inserted in the slot 32. Two patches 21 are attached to the tow strap 20 so that the axle 30 is wrapped by the patches 21 so that the two strap 20 cannot slide relative to the axle 30. The patches 21 are attached to the tow strap 20 by sewing that is troublesome and hence expensive.

As disclosed in U.S. Pat. No. 5,611,520, a tie-down apparatus includes a crossbar 7 and two reels 4 and 14. A strap 20 is tied to the crossbar 7. The reel 4 includes a slot 5. The reel 14 includes a slot 15. Another strap 21 includes a portion inserted in the slot 5 and another portion inserted in the slot 15. The reel 14 is used to wind up the strap 21. A handle 3 is operable to rotate the reel 4 to straighten the strap 21.

As disclosed in U.S. Pat. No. 7,100,902, a tie-down apparatus includes a shaft assembly 2, a fastening unit 3 and a winding unit 4. The winding unit 4 includes a crank 41 and a reel 43. The reel 43 includes a slot (not numbered). The shaft assembly 2 includes two shaft members 21 and 22 separated from each other by a gap (not numbered). A strap 5 includes a portion inserted in the slot of the reel 43 and another portion inserted in the gap between the shaft members 21 and 22. The crank 41 is operable to rotate the reel 43 to wind up a strap 5. The fastening unit 3 is operable to rotate shaft assembly 2 to tighten the strap 5.

As disclosed in U.S. Pat. No. 8,172,203, a tie-down apparatus includes a U-shaped frame 51, a flat shank 52, two plastic bushings 53 and a levering set 54. The flat shank 52 includes a slot 521 and is supported on the U-shaped frame 51. The levering set 54 is connected to the flat shank 52 via the plastic bushings 53. A portion of a strap 4 is inserted in the slot 521. The levering set 54 is operable to rotate the flat shank 52 to wind up the strap 4.

As discussed above, a tow strap apparatus or a tie-down apparatus requires a reel. Some of the reels are structurally complicated. Some other reels are structurally simple but involve complicated processes for assembly or disassembly.

Therefore, the present invention is intended to obviate or at least alleviate the problems encountered in prior art.

SUMMARY OF INVENTION

It is the primary objective of the present invention to provide a structurally simple retractable strap apparatus.

To achieve the foregoing objective, the retractable strap apparatus includes a reel, an axle and a strap. The reel includes a bore axially made therein, a flat face located by the bore, and a slot made therein along a secant line so that the bore is separated from the slot. The axle includes a flat face. The axle is inserted in the bore so that the flat face of the axle is in contact with the flat face of the reel so that the axle is rotatable together with the reel. The strap includes an end directed through the slot and connected to another portion of the strap.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
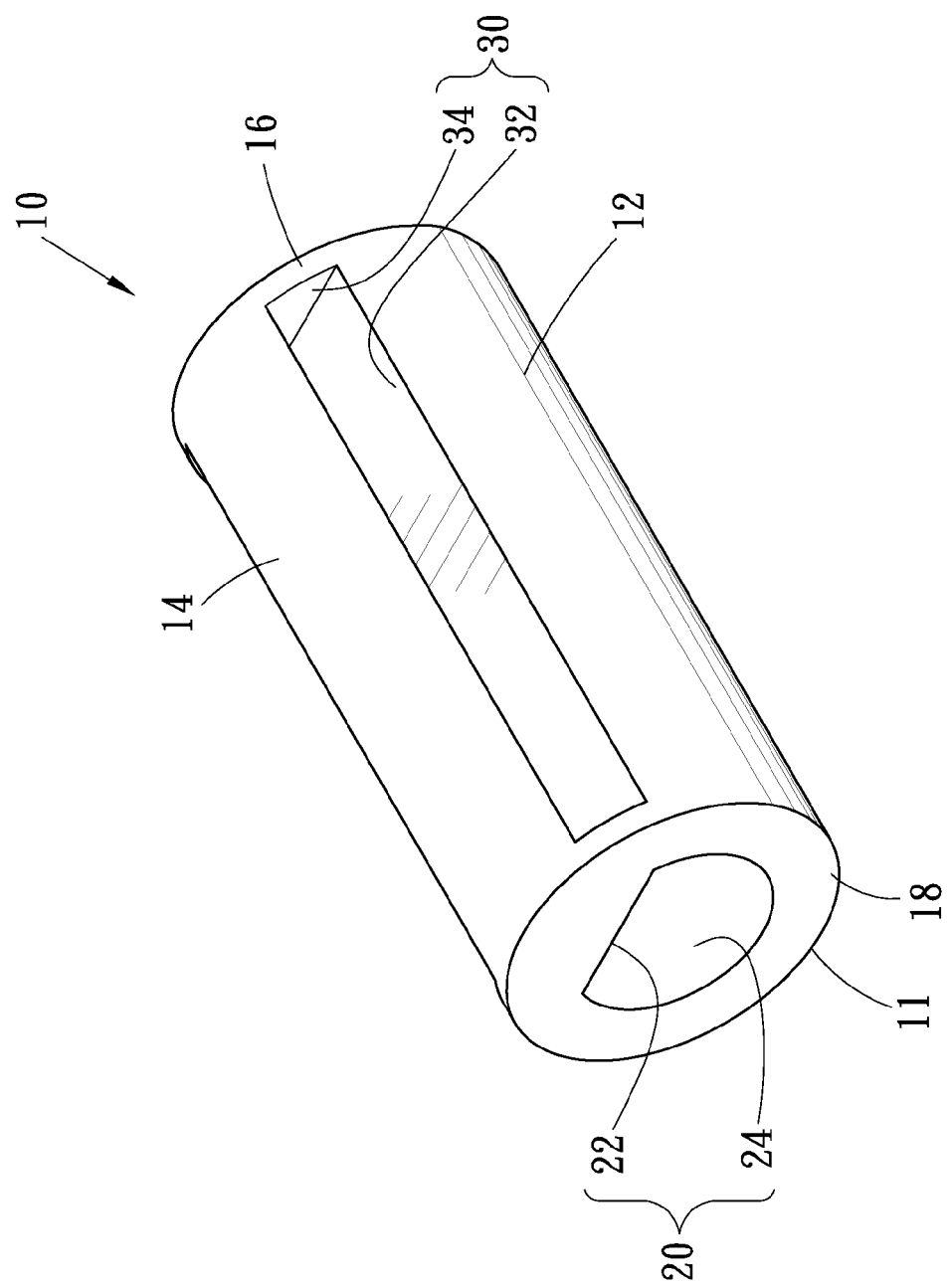
FIG. 1 is a perspective view of a reel according to the first embodiment of the present invention.

Referring to FIG. 1, a reel 10 includes a bore 20 and a slot 30 according to a first embodiment of the present invention. The bore 20 axially extends throughout the reel 10 so that the reel 10 includes two annular faces 18 at two ends. The bore 20 is defined by a flat face 22 and a concave face 24. The reel 10 is preferably made of plastics so that it is light and inexpensive.

The slot 30 extends throughout the reel 10 along a secant line. The slot 30 is defined by two rectangular flat faces 32 and two substantially trapezoidal flat faces 34. The rectangular flat faces 32 extend parallel to each other. The substantially trapezoidal flat faces 34 extend parallel to each other. The rectangular flat faces 32 extend perpendicular to the substantially trapezoidal flat faces 34.

Referring to FIG. 1, one of the rectangular flat faces 32 is located further from the bore 20 and made smaller than the other rectangular flat faces 32. The rectangular flat faces 32 extend parallel to the flat face 22.

The slot 30 divides the reel 10 into a primary portion 12, a secondary portion 14 and two connective portions 16 for connecting the secondary portion 14 to the primary portion 12. The larger rectangular flat face 32 is formed on an internal side of the primary portion 12. The larger rectangular flat face 32 is connected with an arched convex face 11. The smaller rectangular flat face 32 is formed on an internal side of the secondary portion 14. Each of the substantially trapezoidal faces 34 is an internal face of a corresponding one of the connective portions 16.

Figure 2:
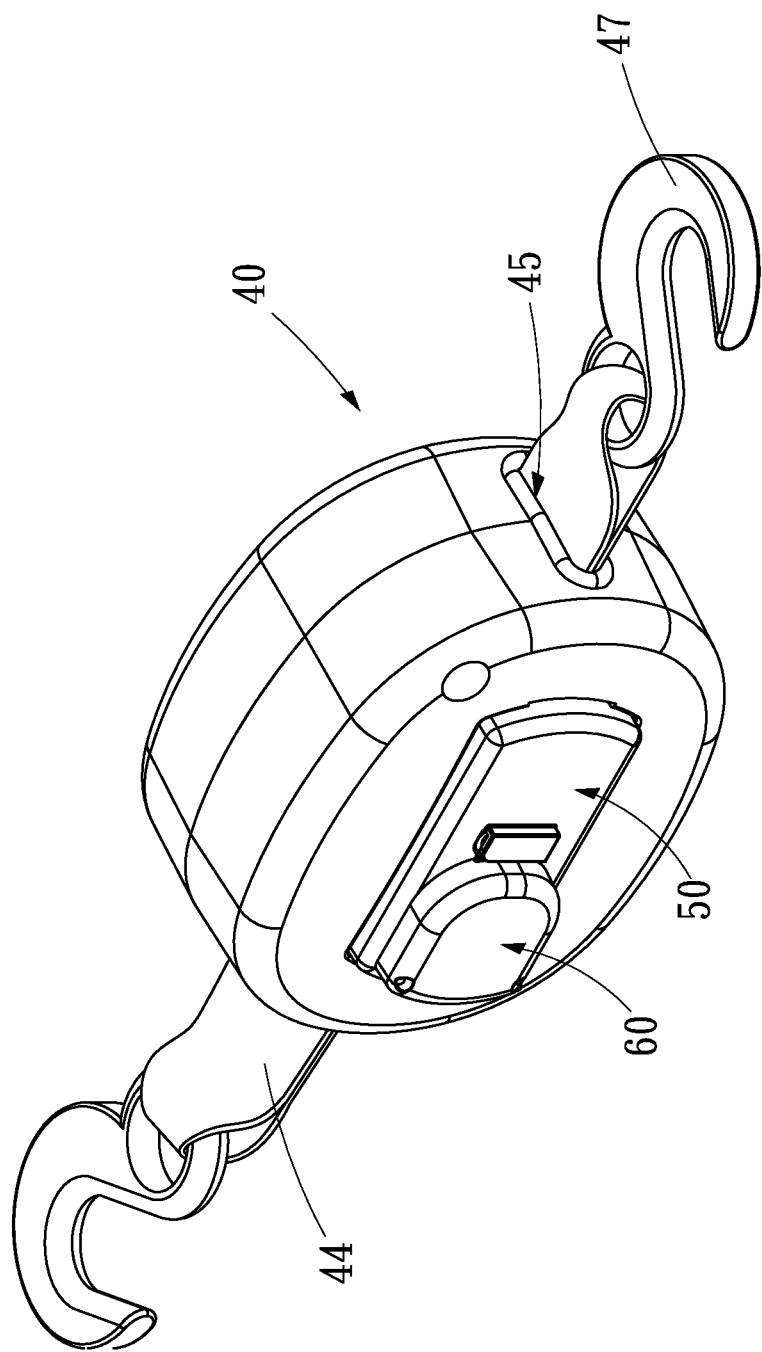
FIG. 2 is a perspective view of a tow strap apparatus including the reel shown in FIG. 1.
Figure 3:
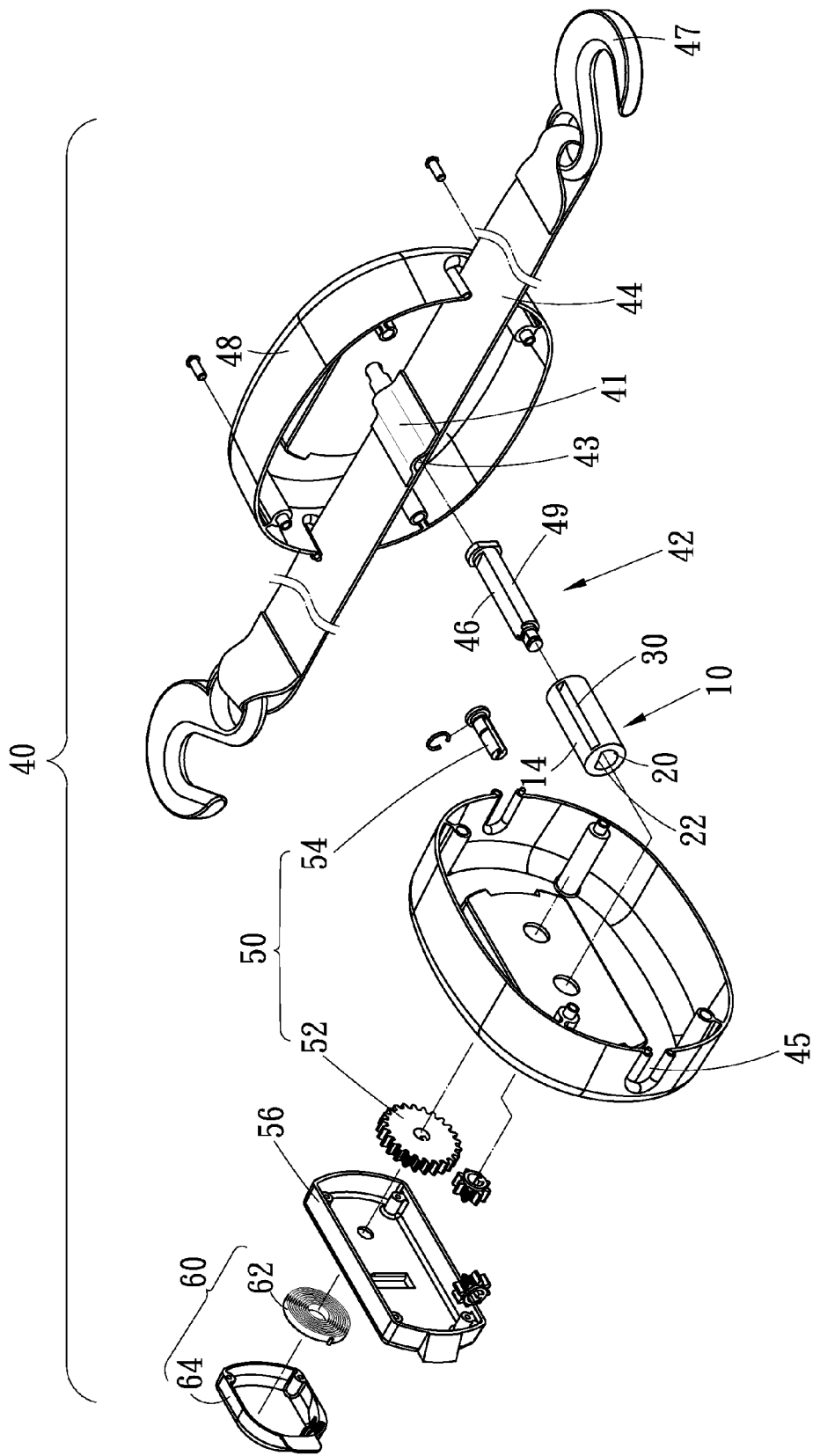
FIG. 3 is an exploded view of the tow strap apparatus illustrated in FIG. 2.

Referring to FIGS. 2 and 3, the reel 10 is used in a tow strap apparatus 40. The tow strap apparatus 40 includes a shell 48, an axle 42, a tow strap 44, an automatic reeling unit 60 and a transmission unit 50. The shell 48 includes a slot 45. The shell 48 consists of two halves that connected to each other after elements are placed between them.

The axle 42 is formed with a flat face 46 and a convex face 49. The axle 42 is inserted in the shell 48. The axle 42 is inserted in the bore 20. The flat face 46 is in contact with the flat face 22. The convex face 49 is in contact with the concave face 24. Thus, the axle 42 is rotatable together with the reel 10. The axle 42 is preferably made of metal so that it is strong.

The tow strap 44 includes a portion inserted in the slot 30 before a patch 41 is attached to the tow strap 44 by sewing for example to cover the secondary portion 14 of the reel 10. The secondary portion 14 of the reel 10 is inserted in a space 43 defined between the patch 41 and the tow strap 44. That is, the secondary portion 14 of the reel 10 is wrapped by the patch 41 and the tow strap 44. Thus, the tow strap 44 is wound onto or unwound from the reel 10 as the reel 10 is rotated. The tow strap 44 includes two ends each connected to a hook 47.

The automatic reeling unit 60 includes a coil spring 62 and a cover 64. The coil spring 62 includes an end connected to a cover 56 that is attached to the shell 48. The coil spring 62 is covered by the cover 64 that is attached to the cover 56.

The transmission unit 50 includes a gear train 52 and a shaft 54 in addition to the cover 56. The shaft 54 is connected to another end of the coil spring 62. The gear train 52 includes a gear connected to the shaft 54 and another gear connected to the axle 42. The gear train 52 and the shaft 54 are covered by the cover 56 that is attached to the shell 48. However, the shaft 54 includes an end that extends beyond the cover 56 and is connected to the coil spring 62.

Advantageously, the use of the reel 10 allows the axle 42 to be made without any bore or slot that would otherwise reduce the strength of the axle 42. Therefore, the axle 42 is stronger than the prior art.

Figure 4:
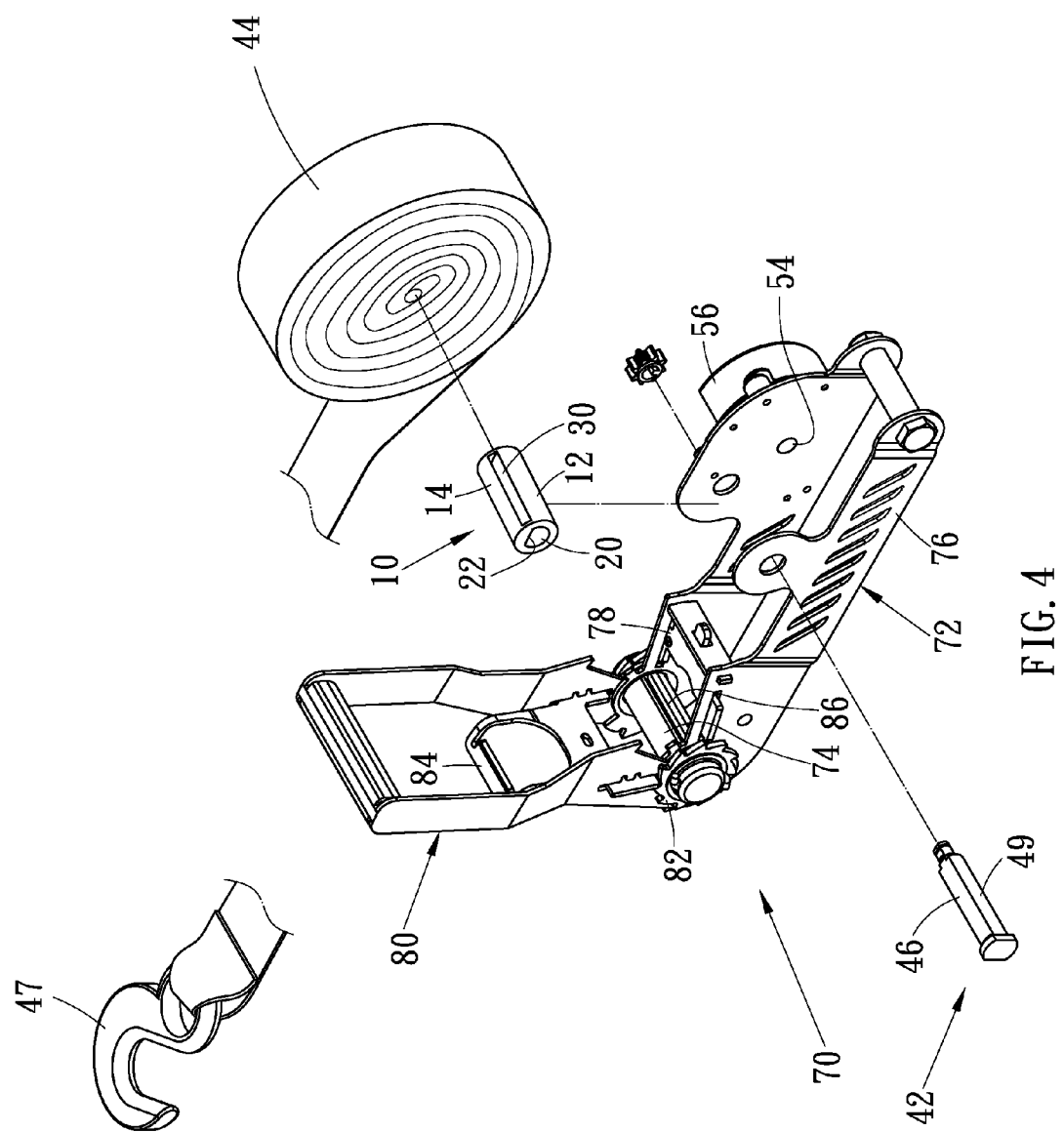
FIG. 4 is a perspective view of a tie-down apparatus including the reel shown in FIG. 1.
Figure 5:
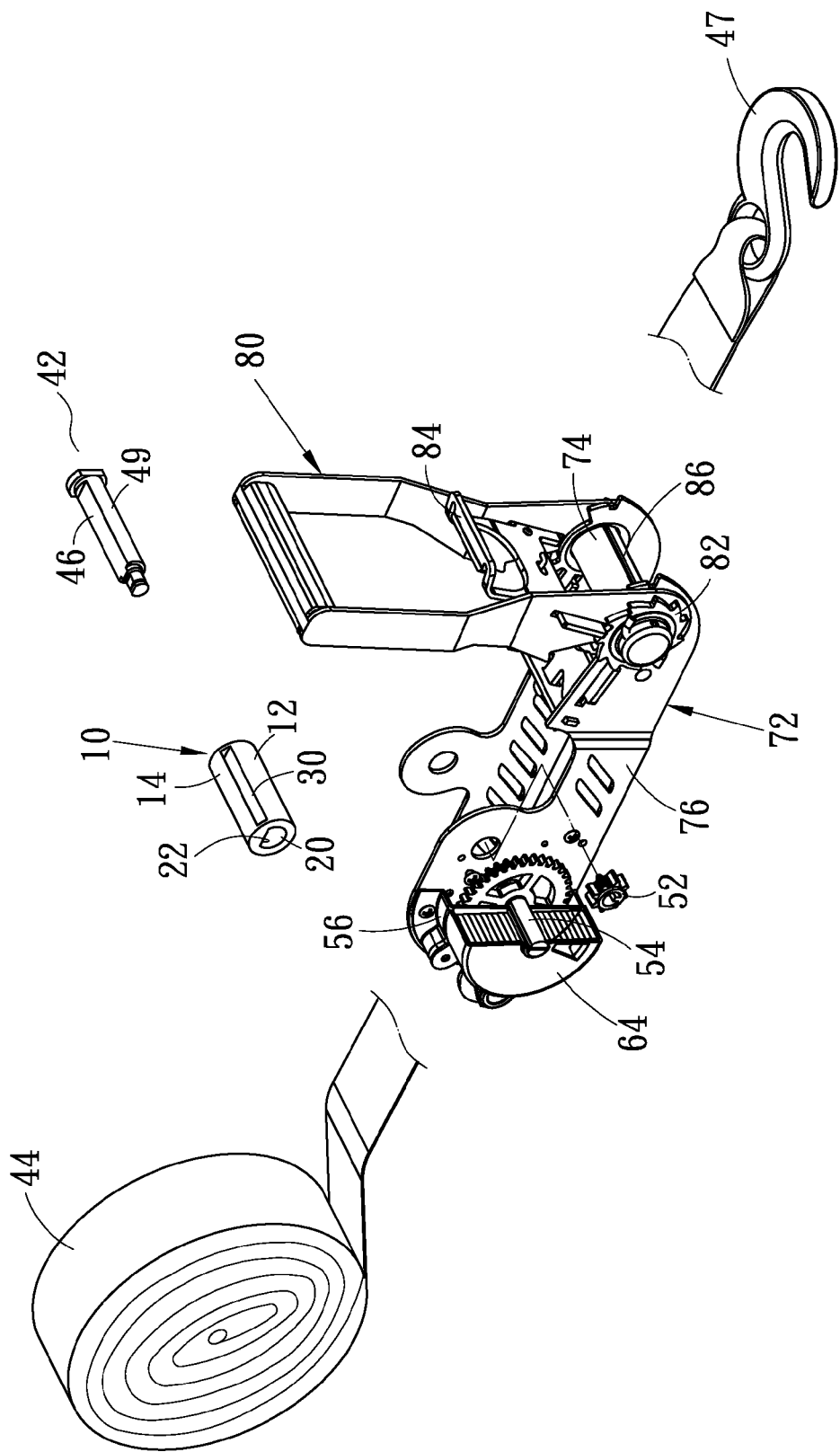
FIG. 5 is another perspective view of the tie-down apparatus shown in FIG. 4.

Referring to FIGS. 4 and 5, the reel 10, the transmission unit 50 and the automatic reeling unit 60 are used in a tie-down apparatus 70. The tie-down apparatus 70 further includes a handle 80 pivotally connected to a base 72 by a shaft 74.

The base 72 includes two lateral plates 76 separated from each other. Each lateral plate 76 supports a corresponding end of the axle 42. The reel 10 is supported on the axle 42.

Figure 6:
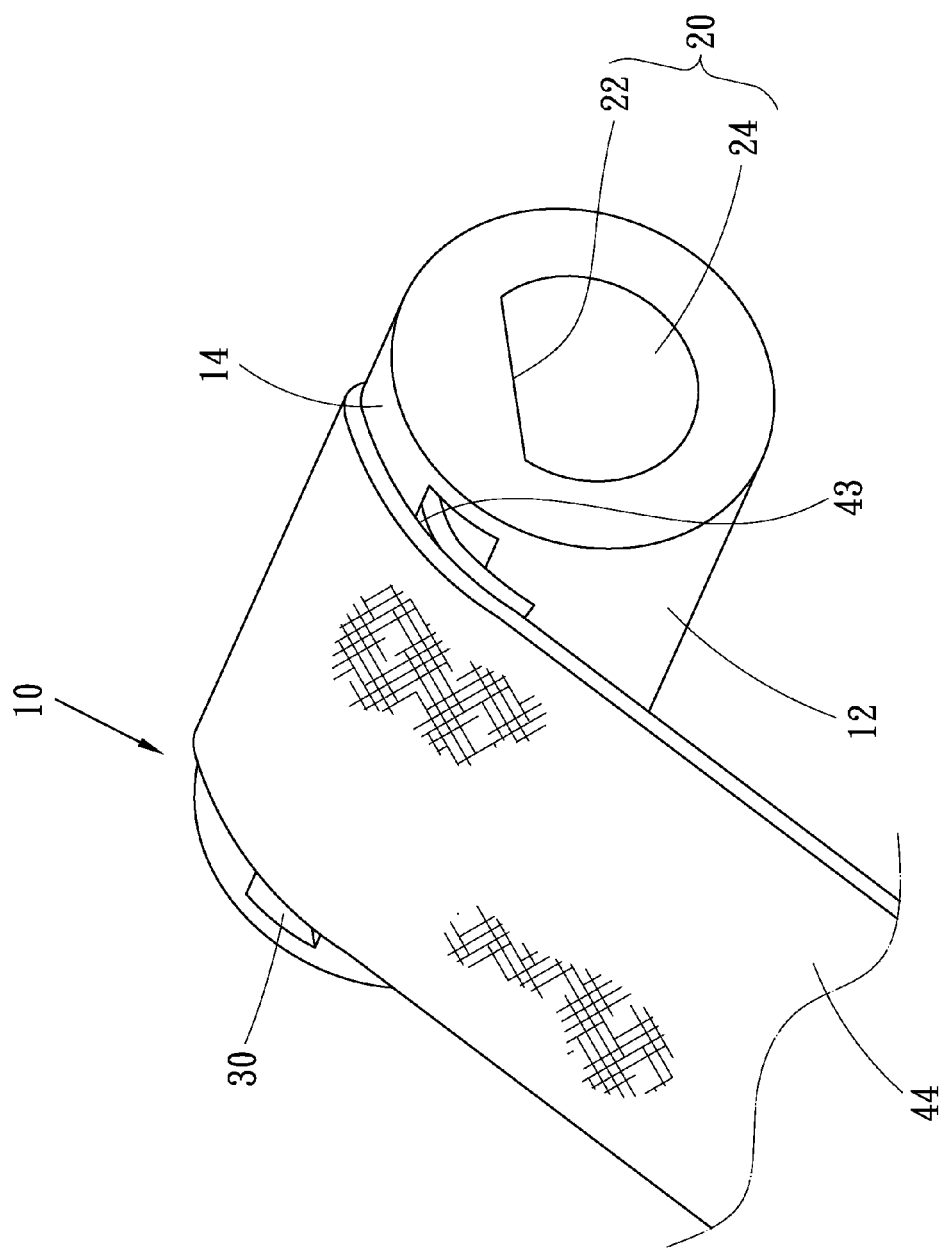
FIG. 6 is a perspective view of a strap wound on the reel shown in FIG. 1.

A first end of the strap 44 is directed through a slot 86 made in the shaft 74 and connected to a hook 47. Referring to FIG. 6, a second end of the strap 44 is moved over the secondary portion 14 of the reel 10 before it is directed through the slot 30. The second end of the strap 44 is placed beneath and attached to another portion of the strap 44 by sewing for example.

The automatic reeling unit 60 is attached to the transmission unit 50 that is supported on one of the lateral plates 76. The automatic reeling unit 60 is connected to the axle 42 via the transmission unit 50 as described above. Thus, the automatic reeling unit 60 reels the strap 44 onto the reel 10 via the transmission unit 50.

Two ratchet wheels 82 are supported on the shaft 74. A detent 78 is movably supported on the lateral plates 76. The detent 78 is elastically biased towards the ratchet wheels 82. Another detent 84 is movably supported on the handle 80. The detent 84 is elastically biased towards the ratchet wheels 82.

The handle 80 can be pivoted on the base 72 to and fro so that the detents 84 and 78 alternately engage with the ratchet wheels 82 to further tighten the strap 44.

The handle 80 can be pivoted on the base 72 to an idle position where both of the detents 84 and 78 are disengaged from the ratchet wheels 82. Thus, the strap 44 can be unwound from the reel 10 against the automatic reeling unit 60 through the transmission unit 50, or the automatic reeling unit 60 is allowed to reel the strap 44 onto the reel 10 via the transmission unit 50.

Figure 7:
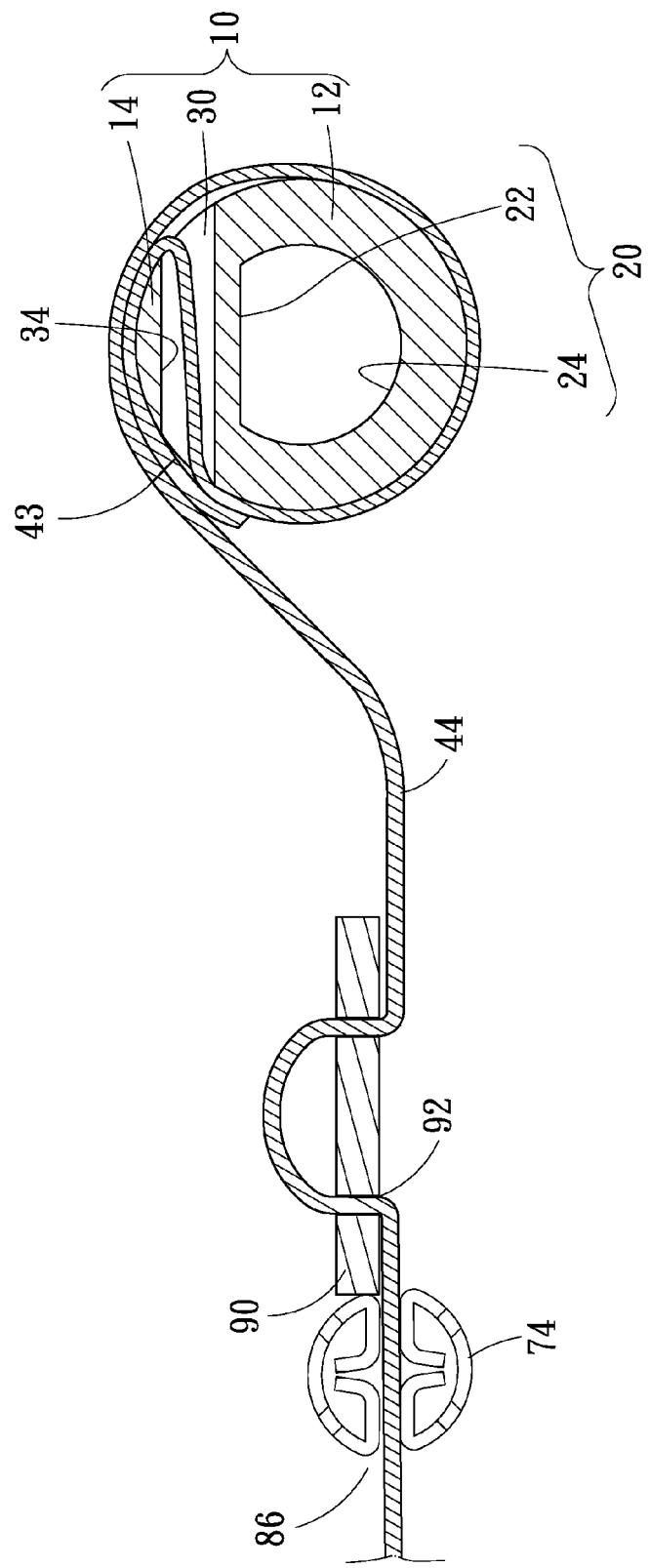
FIG. 7 is a partial and cross-sectional view of the tie-down apparatus shown in FIG. 4.

Referring to FIG. 7, the second end of the strap 44 is directed through the slot 30 before it is moved over the secondary portion 14 of the reel 10. The second end of the strap 44 is placed on and attached to another portion of the strap 44 by sewing for example.

The strap 44 is further directed through two slots 92 made in a restraining element 90. The restraining element 90 can be placed against the shaft 74 so that the strap 44 cannot further be released from the reel 10.

Figure 8:
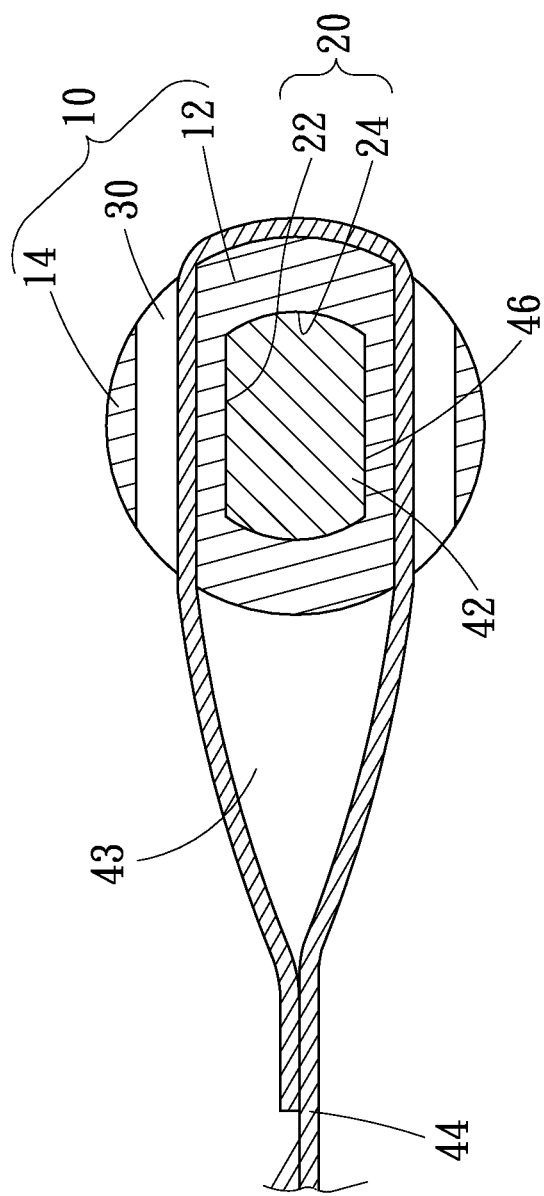
FIG. 8 is a FIG. 7 is a cross-sectional view of a reel according to the second embodiment of the present invention.

Referring to FIG. 8, there is a reel 10 according to a second embodiment of the present invention. The second embodiment is like the first embodiment except several things. Firstly, the reel 10 includes two slots 30. The bore 20 is located between the slots 30. Secondly, the bore 20 is defined by two flat faces 22 and two arched faces 24. Accordingly, the axle 42 includes two flat faces 46 in contact with the flat faces 22 of the bore 20.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A retractable strap apparatus including:
   a reel including a bore axially made therein, a flat face formed next to the bore, and a slot separated from the bore;
   an axle including a flat face, wherein the axle is inserted in the bore so that the flat face of the axle is in contact with the flat face formed next to the bore of the reel so that the axle is rotatable together with the reel; and
   a strap including an intermediate portion inserted in the slot and two ends located out of the reel.

2. The retractable strap apparatus according to claim 1, wherein the reel includes a primary portion, a secondary portion and two connective portions for connecting the primary portion to the secondary portion, wherein the slot is located between the primary portion and the secondary portion.

3. The retractable strap apparatus according to claim 2, wherein the primary portion includes a flat face, wherein the secondary portion includes a flat face extending parallel to the flat face of the primary portion.

4. The retractable strap apparatus according to claim 3, wherein the flat face of the primary portion extends parallel to the flat face formed next to the bore.

5. The retractable strap apparatus according to claim 2, including a patch attached to the strap at two ends, wherein the secondary portion of the reel is sandwiched between the patch and the strap.

6. The retractable strap apparatus according to claim 2, wherein the strap includes an end wrapped around the secondary portion and connected to another portion of the strap.

7. The retractable strap apparatus according to claim 1, including a restraining element formed with two slots, wherein the strap is directed through the slots of the restraining element.

8. The retractable strap apparatus according to claim 1, wherein the reel is made of plastics, wherein the axle is made of metal.

9. A retractable strap apparatus including:
- a reel including a bore axially made therein, two flat faces formed next to the bore, and a slot separated from the bore;
- an axle including two flat faces, wherein the axle is inserted in the bore so that the flat faces of the axle are in contact with the flat faces formed next to the bore so that the axle is rotatable together with the reel; and
- a strap including an end directed through the slot and connected to another portion of the strap.

\* \* \* \* \*